US012152592B2

(12) United States Patent
Lim

(10) Patent No.: US 12,152,592 B2
(45) Date of Patent: Nov. 26, 2024

(54) PUMP CONTROL SYSTEM CAPABLE OF DETECTING FAULT OF PUMP

(71) Applicant: Enssel Inc., Seongnam-si (KR)

(72) Inventor: Yong-il Lim, Seoul (KR)

(73) Assignee: ENSSEL INC., Seongnam-si (KR)

( * ) Notice: Subject to any disclaimer, the term of this patent is extended or adjusted under 35 U.S.C. 154(b) by 96 days.

(21) Appl. No.: 18/073,085

(22) Filed: Dec. 1, 2022

(65) Prior Publication Data

US 2023/0250824 A1 Aug. 10, 2023

(30) Foreign Application Priority Data

Feb. 4, 2022 (KR) ........................ 10-2022-0014546

(51) Int. Cl.
*F04D 15/02* (2006.01)
*F04D 29/66* (2006.01)

(52) U.S. Cl.
CPC ......... *F04D 15/0245* (2013.01); *F04D 29/66* (2013.01); *F05D 2260/96* (2013.01)

(58) Field of Classification Search
CPC .......... F04D 49/02; F04D 29/66; F04D 51/00; F05D 2260/96; F05D 2270/334
See application file for complete search history.

(56) References Cited

U.S. PATENT DOCUMENTS

2010/0082275 A1* 4/2010 Borsting ............. F04D 15/0066 702/56
2010/0092307 A1* 4/2010 Malakhova ............. F04B 23/06 417/44.3
2019/0339162 A1* 11/2019 Munk .................. G01N 29/036
2020/0049152 A1* 2/2020 Gu ...................... F04D 15/0066
2023/0221915 A1* 7/2023 Kawai ...................... G09G 5/20 345/440

FOREIGN PATENT DOCUMENTS

KR 10-2066744 2/2020

* cited by examiner

*Primary Examiner* — Kenneth J Hansen
(74) *Attorney, Agent, or Firm* — KILE PARK REED & HOUTTEMAN PLLC

(57) ABSTRACT

According to the disclosure, a pump unit includes a vibration sensor or a noise sensor, and a controller may control a driving operation of a pump driving unit on the basis of vibration data or noise data. Furthermore, in case that pump driving units are provided, control is performed to adjust a fault threshold value in consideration of influence of vibration or noise therebetween, and thus the reliability of detection or diagnosis of a fault of a pump can be improved, and the safety of an operator can be promoted.

8 Claims, 2 Drawing Sheets

1000

PUMP CONTROL SYSTEM CAPABLE OF DETECTING FAULT OF PUMP

CROSS-REFERENCE TO RELATED APPLICATION

This application claims priority to and the benefit of Korean Patent Application No. 10-2022-0014546 under 35 U.S.C. § 119 filed on Feb. 4, 2022 in the Korean Intellectual Property Office (KIPO), the contents of which are incorporated herein by reference in its entirety.

BACKGROUND

1. Technical Field

The document relates to a pump control system capable of detecting a fault of a pump and relates to a technique for facilitating management of a pump control system by providing a noise sensor and vibration sensor on a pump driving unit, monitoring a state of a pump in real time, and detecting a fault of the pump.

2. Description of the Related Art

Industrial facilities such as semiconductors and display devices are inevitably using pumps to maintain the flow of various fluids. In particular, in recent years, various processes are performed in a state in which an inside of a chamber is made in a vacuum state, and the use of vacuum pumps is increasing to achieve maintaining of the vacuum state.

The vacuum pumps are often fully operated every hour and thus may be easily degraded or broken down. Maintenance, repair, and a replacement cycle of the vacuum pumps also vary according to a product process and manufacturing facilities, the replacement cycle of the vacuum pumps is 5 to 7 years on average, and the maintenance, the repair, and the replacement are required once or twice a year.

In such a manufacturing environment, verification of states of the vacuum pumps is required to reduce a production cost, and a considerable effort and technique are required for management. It is most important to monitor and evaluate the degree of fragility of the vacuum pumps over time during a manufacturing process and to prevent a sudden decrease in the degree of vacuum due to sudden stoppage of the vacuum pumps.

The expected lifetime of the vacuum pumps also varies depending on an environment in which the vacuum pumps are used. For example, in manufacturing processes such as chemical vapor deposition (CVD), etching, and diffusion processes, powder is generated during a reaction of a process gas, the powder acts as a factor impairing vacuum performance, and thus more careful attention is required for maintenance and replacement. Further, since pumping characteristics of the vacuum pumps vary according to environmental conditions such as heat, humidity, and external vibration, it is necessary to control an input value in consideration of the environmental conditions.

However, in the related art, whether the vacuum pump is in an abnormal state is identified by measuring an exhaust speed, a pressure of a suction port, a driving current, a consumption pressure, a temperature, an exhaust pressure, and the like while the vacuum pump is in operation or by empirical determination of an operator for a fault in an operation state using visual observation, touch, and/or sound. In this related art, it is difficult to achieve reliability for maintenance of the vacuum pump, and since data measured in case that the operation of the vacuum pump is malfunctioned is insufficient, it is difficult to determine an exact replacement time.

Further, since each operator performs determination according to his/her own standard during the maintenance and replacement of the vacuum pump, a vacuum pump management method such as analysis of the replacement cycle of the vacuum pump according to the related art is difficult to ensure accuracy in determining whether the replacement or maintenance is necessary.

Korean Patent Application Publication No. 10-2066744 (Title of invention: Remote monitoring and control system capable of preventing and diagnosing fault of motor pump using image analysis) discloses a technique in which a linear or circular laser light is emitted on a motor pump or the like, an image is captured using a camera and stored and analyzed to calculate the degree of vibration using a displacement value of the light, thus images of mechanical devices are monitored while vibration displacement values thereof are detected, the displacement value over time is expressed and stored, and thus the replacement cycle of the device and the presence or absence of a fault can be predicted. However, a technique in which a noise sensor and a vibration sensor are arranged in a pump to collect diagnostic data in real time is not disclosed. Further, a technique of collecting diagnostic data in consideration of noise and vibration that pumps exert from each other is not disclosed.

SUMMARY

The disclosure relates to a pump control system capable of detecting a fault of a pump, and the purpose of the disclosure is to establish a reliable pump control system by diagnosing the performance of the pump in real time and further automatically controlling a pump driving operation.

A pump control system according to an aspect may include a pump unit including: a pump driving unit performing pumping; a vibration sensor detecting vibrations generated by the pump driving unit and outputting vibration data; and a noise sensor detecting noise generated by the pump driving unit and outputting noise data, and a controller electrically connected to each of the vibration sensor and the noise sensor to receive the vibration data and the noise data and electrically connected to the pump driving unit to control a pumping driving operation, wherein the controller may control the pump driving unit to be switched from an On mode to an idle mode or an Off mode in case that the vibration data or noise data exceeds a fault threshold value, and thus performance abnormality occurring in the pump can be detected in advance and the pump can be automatically driven and controlled.

BRIEF DESCRIPTION OF THE DRAWINGS

The above and other objects, features and advantages of the disclosure will become more apparent to those of ordinary skill in the art by describing exemplary embodiments thereof in detail with reference to the accompanying drawings, in which.

DETAILED DESCRIPTION OF THE EMBODIMENTS

Figure 1:
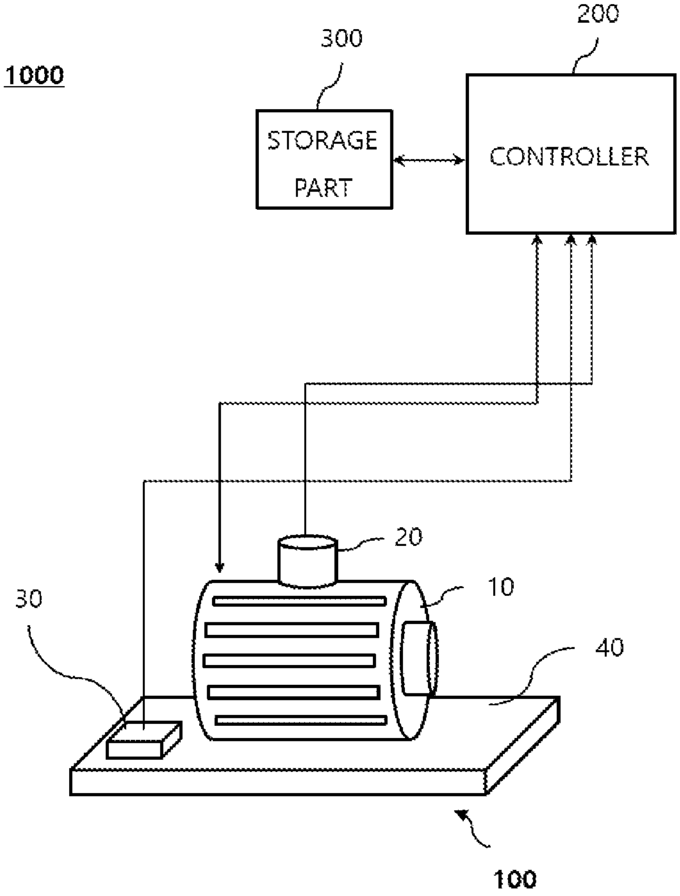
FIG. 1 is a schematic view for describing a pump control system according to an embodiment.

Hereinafter, the disclosure will be described in detail so that those skilled in the art may easily understand and reproduce the disclosure through exemplary embodiments described with reference to the accompanying drawings. In the description of the disclosure, when it is determined that the detailed description of related widely known functions or configurations may make the subject matter of the embodiments of the disclosure unclear, the detailed description will be omitted. Terms used throughout the specification are terms defined in consideration of functions in the embodiments of the disclosure, and since the terms may be sufficiently modified according to the intention, the custom, or the like of a user or operator, a definition of these terms should be made on the basis of the contents throughout the specification.

Further, the above aspects and additional aspects of the disclosure will become apparent through the following embodiments. Although the aspects selectively described in the specification or configuration of the embodiments selectively described in the specification are illustrated as a single integrated component in the drawings, it is understood that, unless otherwise stated, the aspects and configurations may be combined with each other when it is not apparent to those skilled in the art that there is a technical contradiction.

Thus, since the embodiments described in the specification and configurations illustrated in the drawings are merely embodiments of the disclosure and do not represent all the technical spirit of the disclosure, it should be understood that various equivalents and modifications that may replace the embodiments and the configurations are present at filling of the application.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

It will be understood that the terms "contact," "connected to," and "coupled to" may include a physical and/or electrical contact, connection, or coupling.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

It will be understood that, although the terms ""first,"" ""second,"" etc. may be used herein to describe various elements, these elements should not be limited by these terms. These terms are only used to distinguish one element from another element. Thus, a ""first"" element discussed below could also be termed a ""second"" element without departing from the teachings of the present disclosure.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic view for describing a pump control system according to an embodiment. As illustrated, a pump control system 1000 may include a pump unit 100, a controller 200, and a storage part 300, and the pump unit 100 may include a pump driving unit 10, a vibration sensor 20, a noise sensor 30, and a base plate 40. The pump unit 100 and the controller 200 may be connected in a one-to-one correspondence.

The pump driving unit 10 may perform pumping. The pump driving unit 10 may be a vacuum pump driving unit that suctions a fluid, but the type of a pump is not limited. A pipe (not illustrated) providing a passage for a fluid may be connected to the pump driving unit 10.

The vibration sensor 20 may detect vibrations generated by the pump driving unit 10 and output vibration data. The vibration data may be a digital signal. The vibration sensor 20 may be provided on the pump driving unit 10 to maximize detection of the vibration.

In some embodiments, the vibration sensor 20 may be provided as vibration sensors 20 which are simultaneously provided on the pump driving unit 10 and may be connected to the controller 200. Accordingly, it is possible to diagnose a fault of each part of the pump and to easily replace components.

The noise sensor 30 may detect noise generated by the pump driving unit 10 and output noise data. The noise data may be a digital signal. The noise sensor 30 may be attached to the pump driving unit 10 but may be provided on and adjacent to the base plate 40 as illustrated.

The controller 200 may be electrically connected to each of the vibration sensor 20 and the noise sensor 30 to receive the vibration data and the noise data and electrically connected to the pump driving unit 10 to control a pumping driving operation.

The controller 200 may control an operation of supplying power to the pump driving unit 10.

The pumping driving operation may be classified into three types including an "Off mode" in which power supplying to the pump driving unit 10 is cut off, an "On mode' in which power is supplied to the pump driving unit 10 and pumping is performed, and an idle mode in which power is supplied to the pump driving unit 10 but pumping is not performed. The pump driving unit 10 may be switched between these three modes and may be provided with a switching circuit (not illustrated).

The pump driving unit 10 may receive power from a power supply (not illustrated), and the controller 200 may control power supplying to the pump driving unit 10.

In case that the vibration data or the noise data exceeds a fault threshold, the controller 200 may (feedback) control the pump driving unit to be switched from the On mode to the idle mode or the Off mode.

The fault threshold may mean an embodiment in which the vibration data or the noise data exceeds the threshold (a threshold value) because vibrations and noise are abnormally generated due to aging, heat, humidity, loosening of bolts, and the like of the pump driving unit and may additionally mean an embodiment in which, in the "On mode," the vibrations and noise are not generated, and thus, the vibration data or the noise data are output not to exceed the threshold or more.

The pump control system 1000 according to the embodiment may further include a storage part 300 in which the vibration data and the noise data are stored in a time-series manner.

The controller 200 may control the pump driving unit 10 after analyzing a time-serial pattern of the vibration data and the noise data stored in the storage part 300. An Artificial intelligence or deep learning analysis technologies may be applied to the time-series pattern analysis, and various pieces of data and artificial intelligence/deep learning software may be stored in the storage part 300. Accordingly, the status of the pump driving unit 10 can be more efficiently analyzed, and a fault can be accurately predicted. The controller 200 and the storage part 300 may be configured as a cloud server.

Figure 2:
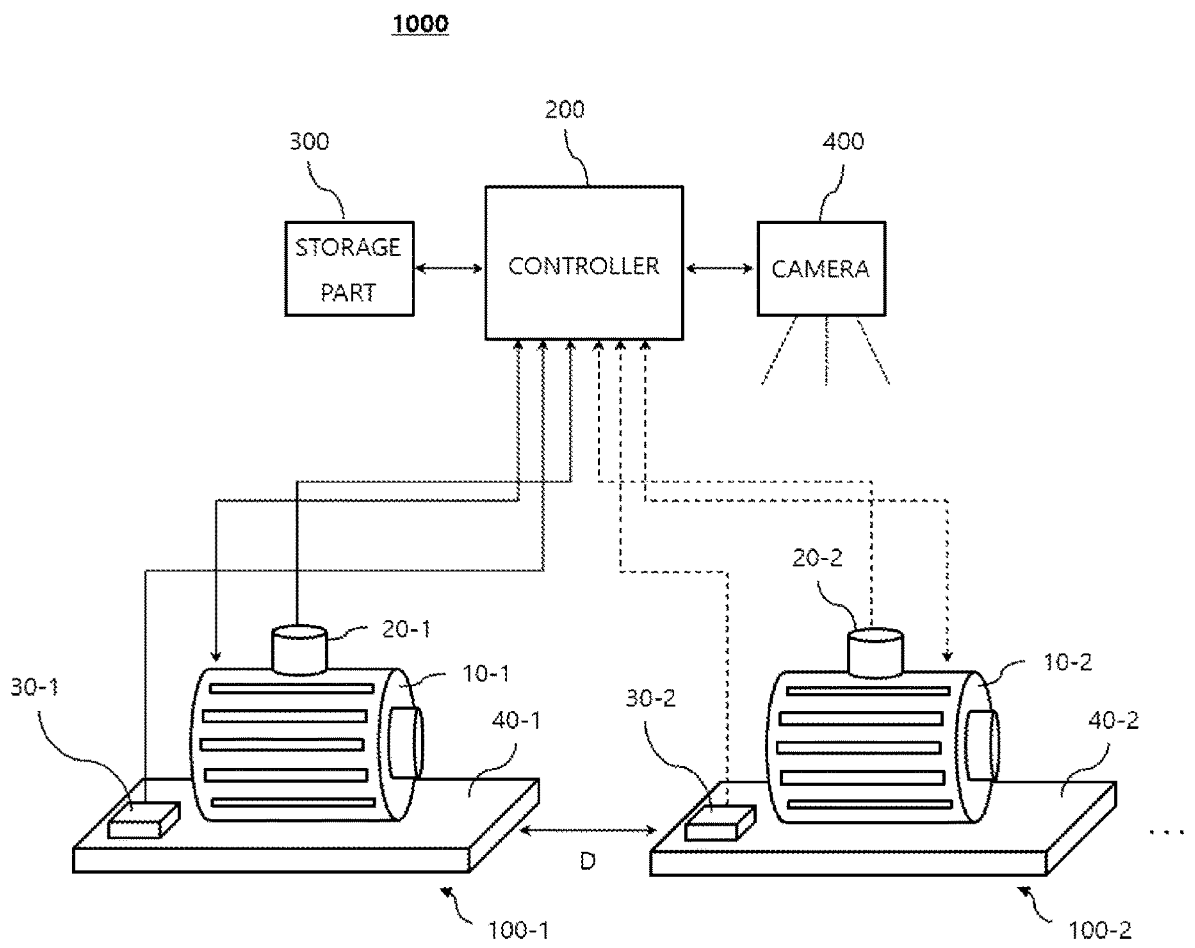
FIG. 2 is a schematic view for describing a pump control system according to another embodiment.

FIG. 2 is a schematic view for describing a pump control system according to another embodiment. As illustrated, the pump control system 1000 may include a first pump unit 100-1, a second pump unit 100-2, the controller 200, the storage part 300, and a camera 400. The first pump unit 100-1 may include a first pump driving unit 10-1, a first vibration sensor 20-1, and a first noise sensor 30-1. The second pump unit 100-2 may include a second pump driving unit 10-2, a second vibration sensor 20-2, and a second noise sensor 30-2. Pump units 100-1, 100-2, . . . **100-*n* and the controller 200** may be connected in an n-to-one correspondence.

According to the embodiment, the pump control system 1000 including noise sensors may include the following configuration.

The first pump driving unit 10-1 may perform pumping. The first pump driving unit 10-1 may be a vacuum pump driving unit, but the type of the pump is not limited. A pipe (not illustrated) providing a passage for a fluid may be connected to the first pump driving unit 10-1.

The second pump driving unit 10-2 may perform pumping. The second pump driving unit 10-2 may be a vacuum pump driving unit, but the type of the pump is not limited. A pipe (not illustrated) providing a passage for a fluid may be connected to the second pump driving unit 10-2.

The first noise sensor 30-1 may detect noise generated by the first pump driving unit 10-1 and output first noise data. The first noise sensor 30-1 may be attached to the first pump driving unit 10-1 but may be provided on and adjacent to a first base plate 40-1 as illustrated.

The second noise sensor 30-2 may detect noise generated by the second pump driving unit 10-2 and output second noise data. The second noise sensor 30-2 may be attached to the second pump driving unit 10-2 but may be provided on and adjacent to a second base plate 40-2 as illustrated. The noise level can be measured in units of decibels (DB).

The controller 200 may be electrically connected to each of the first noise sensor 30-1 and the second noise sensor 30-2 to receive the first noise data and the second noise data and electrically connected to each of the first pump driving unit 10-1 and the second pump driving unit 10-2 to control a pumping driving operation. A power supply (not illustrated) for supplying power to the first pump unit 100-1 and the second pump unit 100-2 may be additionally provided.

The pumping driving operation may be classified into three types including an "Off mode" in which power supplying to the pump driving units 10-1 and 10-2 is cut off, an "On mode" in which the power is supplied to the pump driving units 10-1 and 10-2 and pumping is performed, and an idle mode in which the power is supplied to the pump driving units 10-1 and 10-2 but pumping is not performed. The pump driving units 10-1 and 10-2 may be switched between these three modes and may be provided with a switching circuit (not illustrated).

The pump driving units 10-1 and 10-2 may receive power from the power supply (not illustrated), and the controller 200 may individually control power supplying to the pump driving units 10-1 and 10-2.

In case that any one of the first pump driving unit 10-1 and the second pump unit 10-2 is pump-driven (operated in the On mode), the controller 200 may not adjust a fault threshold value for the first noise data and the second noise data.

On the other hand, in case that the first pump driving unit 10-1 and the second pump driving unit 10-2 are pump-driven (operated in the On mode), the controller 200 may adjust to increase a fault threshold value for each of the first noise data and the second noise data. Accordingly, in case that the first pump driving unit 10-1 and the second pump driving unit 10-2 have preset fault thresholds obtained in consideration of only their own noise, the fault threshold value is increased as described above, thereby promoting the accuracy of diagnosis. For example, in case that the pump is added to a work site, this control technique can be applied advantageously.

According to another embodiment, in case that the first pump driving unit 10-1 and the second pump driving unit 10-2 are pump-driven (operated in the On mode), the controller 200 may adjust to decrease the fault threshold value for each of the first noise data and the second noise data. Accordingly, in case that the first pump driving unit 10-1 and the second pump driving unit 10-2 have preset fault thresholds obtained in consideration of mutually generated noise as well as only their own noise, the fault threshold value is decreased as described above, thereby promoting the accuracy of diagnosis. For example, in case that the pump is partially removed from the work site, this control technique can be applied advantageously.

According to the embodiment, the pump control system 1000 including vibration sensors may include the following configuration.

The first pump driving unit 10-1 may perform pumping. The first pump driving unit 10-1 may be a vacuum pump driving unit, but the type of the pump is not limited. A pipe (not illustrated) providing a passage for a fluid may be connected to the first pump driving unit 10-1.

The second pump driving unit 10-2 may perform pumping. The second pump driving unit 10-2 may be a vacuum pump driving unit, but the type of the pump is not limited. A pipe (not illustrated) providing a passage for a fluid may be connected to the second pump driving unit 10-2.

The first vibration sensor 20-1 may detect vibrations generated by the first pump driving unit 10-1 and output first vibration data. The first vibration sensor 20-1 may be attached to the first pump driving unit 10-1.

The second vibration sensor 20-2 may detect vibrations generated by the second pump driving unit 10-2 and output second vibration data. The second vibration sensor 20-2 may be attached to the second pump driving unit 10-2.

The controller 200 may be electrically connected to each of the first vibration sensor 20-1 and the second vibration sensor 20-2 to receive the first vibration data and the second vibration data and electrically connected to each of the first pump driving unit 10-1 and the second pump driving unit 10-2 to control a pumping driving operation. A power supply (not illustrated) for supplying power to the first pump unit 100-1 and the second pump unit 100-2 may be additionally provided.

The pumping driving operation may be classified into three types including an "Off mode" in which power supplying to the pump driving units 10-1 and 10-2 is cut off, an "On mode' in which the power is supplied to the pump driving units 10-1 and 10-2 and pumping is performed, and an idle mode in which the power is supplied to the pump driving units 10-1 and 10-2 but pumping may be not driven. The pump driving units 10-1 and 10-2 may be switched between these three modes and may be provided with a switching circuit (not illustrated).

The pump driving units 10-1 and 10-2 may receive power from the power supply (not illustrated), and the controller 200 may individually control power supplying to the pump driving units 10-1 and 10-2.

In case that any one of the first pump driving unit 10-1 and the second pump unit 10-2 is pump-driven (operated in the On mode), the controller 200 may not adjust a fault threshold value for the first vibration data and the second vibration data.

On the other hand, in case that the first pump driving unit 10-1 and the second pump driving unit 10-2 are pump-driven (operated in the On mode), the controller 200 may adjust to increase a fault threshold value for each of the first vibration data and the second vibration data. Accordingly, in case that the first pump driving unit 10-1 and the second pump driving unit 10-2 have preset fault thresholds obtained in consideration of only their own vibration, the fault threshold value is increased as described above, thereby promoting the accuracy of diagnosis. For example, in case that the pump is added to the work site, this control technique can be applied advantageously.

According to another embodiment, in case that the first pump driving unit 10-1 and the second pump driving unit 10-2 are pump-driven (operated in the On mode), the controller 200 may adjust to decrease the fault threshold value for each of the first vibration data and the second vibration data. Accordingly, in case that the first pump driving unit 10-1 and the second pump driving unit 10-2 have preset fault thresholds obtained in consideration of mutually generated vibrations as well as only their own vibration, the fault threshold value is decreased as described above, thereby promoting the accuracy of diagnosis. For example, in case that the pump is partially removed from the work site, this control technique can be introduced.

According to the embodiment, the pump control system 1000 may further include the camera 400 configured to measure a distance D between the first pump unit 100-1 and the second pump unit 100-2.

The controller 200 may additionally adjust the fault threshold value on the basis of the measured distance D between the first pump unit 100-1 and the second pump unit 100-2. The camera 400 may measure density (density degree) of pump units, and the controller 200 may perform additional control according to the measured density.

According to the embodiment, the first pump unit 100-1 and the second pump unit 100-2 may have different types. Accordingly, the noise level and/or the vibration intensity may be different. Accordingly, the controller 200 can differently set an initial fault threshold value and can track changes in the noise level and/or the vibration intensity in consideration of the period of use through artificial intelligence or machine learning algorithms.

According to the embodiment, in case that a change in which the vibration intensity (strength) and the noise level (strength) are in inverse proportion to each other is detected, the controller 200 may provide an alarm to the operator and may further adjust the fault threshold value.

According to the embodiment, the controller 200 can calculate fault portions of the first pump unit 100-1 and the second pump unit 100-2 by integrating and analyzing changes in the first vibration data and the second vibration data and the first noise data and the second noise data. For example, in the second pump unit 100-2, in case that the noise level is increased to a predetermined threshold value or more over time as compared to the vibration intensity, it is calculated that a bearing of the second pump unit 100-2 is damaged. Further, in case that the vibration intensity and the noise level are decreased over time, the controller 200 may calculate that powder is excessively loaded on the first pump unit 100-2.

According to the disclosure, the occurrence of a fault can be remotely monitored by diagnosing the performance state of a pump and detecting the fault, replacement timing for components such as the pump, a rotor, and a bearing can be accurately provided, and management can be easily performed.

According to the disclosure, it is not necessary for an operator to individually approach the pump to identify whether a fault occurs and to operate driving of the pump, so that the safety of the operator can be promoted.

According to the disclosure, the accuracy and reliability of diagnosis can be improved by diagnosing the performance in consideration of an effect of noise or vibration between adjacent pumps.

According to the disclosure, as a state of the pump is diagnosed and detected by applying artificial intelligence and a deep learning technology, the accuracy and reliability can be further increased, and thus the operator can accurately predict the possibility of faults.

According to the disclosure, which part of the pump has a fault is calculated, and thus maintenance of the operator can be facilitated.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pump control system comprising:

a pump unit including:

a pump driving unit performing pumping;

a vibration sensor detecting vibrations generated by the pump driving unit and outputting vibration data; and a noise sensor detecting noise generated by the pump driving unit and outputting noise data; and a controller electrically connected to each of the vibration sensor and the noise sensor to receive the vibration data and the noise data and electrically connected to the pump driving unit to control a pumping driving operation, wherein the controller controls the pump driving unit to be switched from an On mode to an idle mode or an Off mode in case that the vibration data or noise data exceeds a fault threshold value, and wherein the controller sets an initial fault threshold value based on at least one of a noise level and a vibration intensity in consideration of at least one of a type of the pump unit and a period of use.

2. The pump control system of claim 1, further comprising a storage part in which the vibration data and the noise data are stored in a time-series manner, wherein the controller controls the pump driving unit after analyzing a time-serial pattern of the vibration data and the noise data stored in the storage part.

3. A pump control system comprising:

a first pump unit including:

a first pump driving unit performing pumping and a first noise sensor detecting noise generated by the first pump driving unit and outputting first noise data;

a second pump unit including:

a second pump driving unit performing pumping and a second noise sensor detecting noise generated by the second pump driving unit and outputting second noise data;

a controller electrically connected to each of the first noise sensor and the second noise sensor to receive the first noise data and the second noise data and electrically connected to each of the first pump driving unit and the second pump driving unit to control a pumping driving operation; and a camera measuring a distance between the first pump unit and the second pump unit, wherein the controller does not adjust a fault threshold value for the first noise data and the second noise data in case that any one of the first pump driving unit and the second pump driving unit is pump-driven (operated in an On mode) and adjusts to increase the fault threshold value for each of the first noise data and the second noise data in case that the first pump driving unit and the second pump driving unit are pump-driven (operated in the On mode), and wherein the controller additionally adjusts the fault threshold based on the measured distance between the first pump unit and the second pump unit.

4. A pump control system comprising:

a first pump unit including:

a first pump driving unit performing pumping; and a first noise sensor detecting noise generated by the first pump driving unit and outputting first noise data;

a second pump unit including:

a second pump driving unit performing pumping; and a second noise sensor detecting noise generated by the second pump driving unit and outputting second noise data;

a controller electrically connected to each of the first noise sensor and the second noise sensor to receive the first noise data and the second noise data and electrically connected to each of the first pump driving unit and the second pump driving unit to control a pumping driving operation; and a camera measuring a distance between the first pump unit and the second pump unit, wherein the controller does not adjust a preset fault value for the first noise data and the second noised data in case that the first pump driving unit and the second pump driving unit are pump-driven (operated in an On mode) and adjusts to decrease the preset fault threshold value for each of the first noise data and the second noise data in case that any one of the first pump driving unit and the second pump driving unit is pump-driven (operated in the On mode), and wherein the controller additionally adjusts the fault threshold based on the measured distance between the first pump unit and the second pump unit.

5. A pump control system comprising:

a first pump unit including a first pump driving unit performing pumping; and a first vibration sensor detecting vibrations generated by the first pump driving unit and outputting first vibration data;

a second pump unit including:

a second pump driving unit performing pumping; and a second vibration sensor detecting vibrations generated by the second pump driving unit and outputting second vibration data;

a controller electrically connected to each of the first vibration sensor and the second vibration sensor to receive the first vibration data and the second vibration data and electrically connected to each of the first pump driving unit and the second pump driving unit to control a pumping driving operation; and a camera measuring a distance between the first pump unit and the second pump unit, wherein the controller does not adjust a preset fault threshold value for the first vibration data and the second vibration data in case that any one of the first pump driving unit and the second pump driving unit is pump-driven (operated in an On mode) and adjusts to increase the preset fault threshold value for each of the first vibration data and the second vibration data in case that the first pump driving unit and the second pump driving unit are pump-driven (operated in the On mode), and wherein the controller additionally adjusts the fault threshold based on the measured distance between the first pump unit and the second pump unit.

6. The pump control system of claim 5, wherein the controller calculates fault portions of the first pump unit and the second pump unit by integrating and analyzing changes in the first vibration data and the second vibration data.

7. A pump control system comprising:

a first pump unit including:

a first pump driving unit performing pumping; and a first vibration sensor detecting vibrations generated by the first pump driving unit and outputting first vibration data;

a second pump unit including:

a second pump driving unit performing pumping; and a second vibration sensor detecting vibrations generated by the second pump driving unit and outputting second vibration data; and a controller electrically connected to each of the first vibration sensor and the second vibration sensor to receive the first vibration data and the second vibration data and electrically connected to each of the first pump driving unit and the second pump driving unit to control a pumping driving operation, wherein the controller does not adjust a preset fault threshold value for the first vibration data and the second vibration data in case that any one of the first pump driving unit and the second pump driving unit is pump-driven (operated in an On mode) and adjusts to decrease the preset fault threshold value for each of the first vibration data and the second vibration data in case that the first pump driving unit and the second pump driving unit are pump-driven (operated in the On mode).

8. The pump control system of claim 7, further comprising a camera measuring a distance (D) between the first pump unit and the second pump unit, wherein the controller additionally adjusts the fault threshold based on the measured distance (D) between the first pump unit and the second pump unit.

* * * * *